United States Patent [19]

Kleinschmidt et al.

[11] 4,277,657
[45] Jul. 7, 1981

[54] APPARATUS FOR DETERMINING THE QUANTITY OF PARTICLES PRESENT IN A CONTAINER

[75] Inventors: Willi Kleinschmidt, Frankfurt; Hartmut Bock, Kelkheim, both of Fed. Rep. of Germany

[73] Assignee: Hoechst Aktiengesellschaft, Frankfurt am Main, Fed. Rep. of Germany

[21] Appl. No.: 49,619

[22] Filed: Jun. 18, 1979

[30] Foreign Application Priority Data

Jun. 21, 1978 [DE] Fed. Rep. of Germany ....... 2827171

[51] Int. Cl.³ .......................................... H01H 35/00
[52] U.S. Cl. .............................. 200/61.21; 200/61.7
[58] Field of Search .................. 200/61.2, 61.21, 61.7, 200/85 R; 414/285, 289; 340/617; 73/290 R

[56] References Cited

U.S. PATENT DOCUMENTS

| 2,915,205 | 12/1959 | Strader | 414/285 |
| 3,044,272 | 7/1962 | Eisendrath | 200/61.2 |
| 3,393,280 | 7/1968 | Skelton et al. | 200/61.2 X |
| 3,443,437 | 5/1969 | Skalka | 73/290 R |
| 3,896,279 | 7/1975 | Sugawara | 200/61.21 |

FOREIGN PATENT DOCUMENTS

| 1927285 | 2/1970 | Fed. Rep. of Germany . | |
| 2261253 | 1/1974 | Fed. Rep. of Germany . | |
| 635816 | 3/1962 | Italy | 200/61.2 |
| 405740 | 7/1966 | Switzerland . | |

OTHER PUBLICATIONS

W. D. Freeman et al., IBM Tech. Disc. Bull.; "Toner Reservoir Level Detector System", vol. 13, No. 11, Apr. 1971, p. 3217.

Primary Examiner—James R. Scott
Attorney, Agent, or Firm—Schwartz, Jeffery, Schwaab, Mack, Blumenthal & Koch

[57] ABSTRACT

Apparatus is disclosed for determining the quantity of particles present in a container. A sensor device is movably mounted in the container and is in contact with the particles. When the filling height in the container falls below a predetermined value, an electrical switch is actuated and emits a signal to an indicator. The sensor device comprises a flap fixed on an axle rotatably mounted in the container. A resilient element presses the flap against the quantity of particles and a cam is mounted on the axle. On rotation of the axle, the cam actuates the electrical switch.

13 Claims, 2 Drawing Figures

U.S. Patent  Jul. 7, 1981  4,277,657
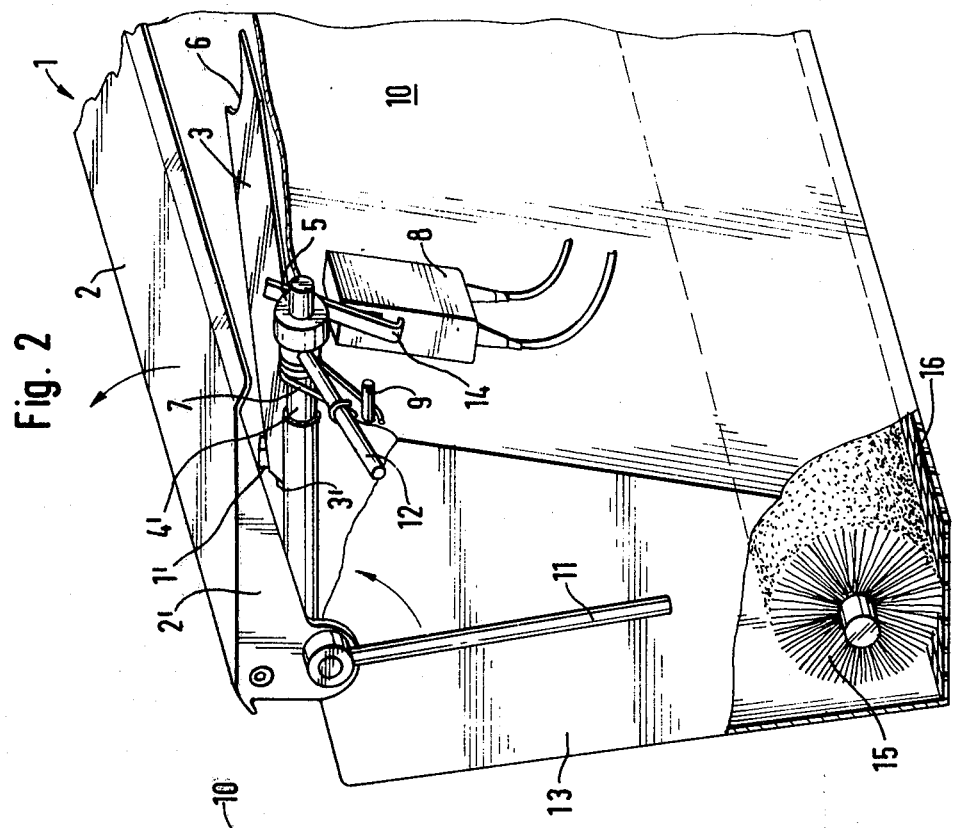
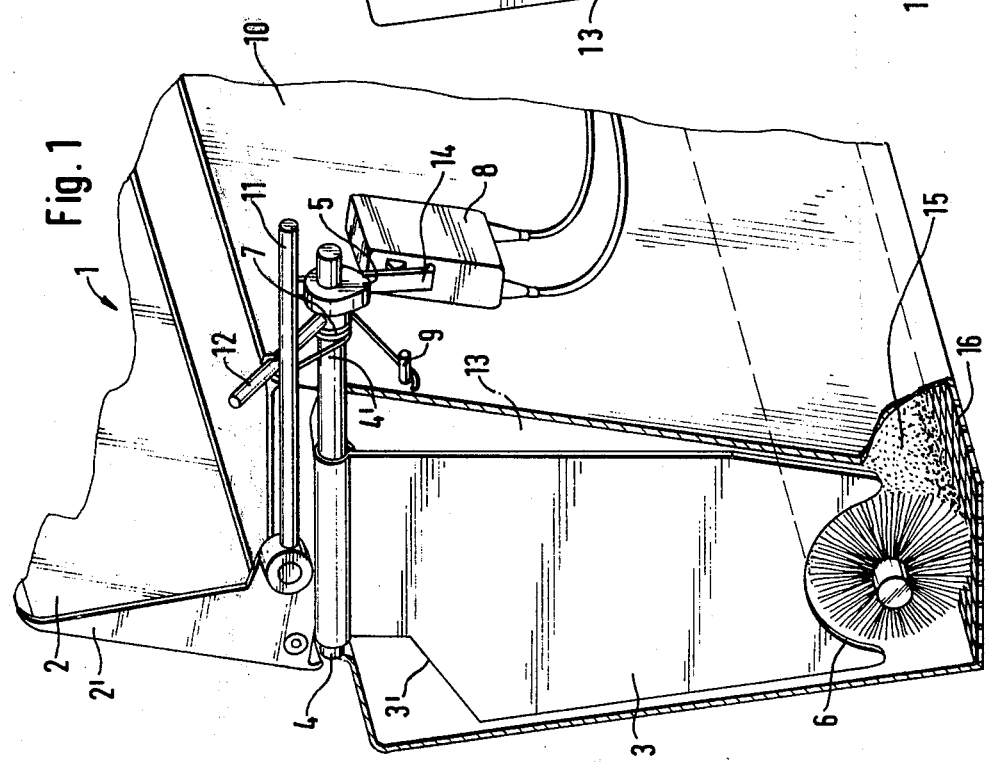

APPARATUS FOR DETERMINING THE QUANTITY OF PARTICLES PRESENT IN A CONTAINER

BACKGROUND OF THE INVENTION

1. Field of the Invention

The invention relates to an apparatus for determining the quantity of particles present in a container, having a sensor device which is movably mounted in the container, which is in contact with the particles and, when the filling height in the container falls below a predetermined value, which actuates an electrical switch member to deliver a signal to an indicator instrument.

The device is suitable, inter alia, for use in electrophotographic copying machines which have storage containers filled with pulverulent toner for replenishing the developer mixture.

2. The Prior Art

As is known, the development of a latent image on an information carrier takes place in such a way that a developer mixture, consisting of toner particles and carrier particles, is brought into contact with the electro-static charge image. On mixing with the carrier particles, the toner particles obtain a tribo-electric charge of defined polarity. The electric field emanating from the charge image attracts the toner particles and detaches them from the carrier particles. Due to the depletion, thus caused, of toner particles in the developer mixture, toner must continuously be supplied to the developer mixture in order to hold the total toner concentration in the developer mixture substantially constant. There is thus a demand for a device for detecting the filling height of toner in a storage container, which device timely indicates that the toner particles are consumed or the filling height within the storage container has fallen below a given mark, so that the operating personnel refill the storage container with toner, and operation of the copying machine with uniform image quality of the developed images is thus ensured.

A number of level-measuring devices for detecting the filling height of toner particles in a toner stock container is known, among which, inter alia, an electrical switching arrangement may be mentioned; the arrangement responds when the filling height in the storage container falls below a given value, emitting a signal to an indicator instrument in a remote position. It is a disadvantage here that, because of their small size, the toner particles can penetrate into the switch or into the switch elements and can thus cause interference with the generation of the signal.

German published application DE-OS No. 2,261,253 discloses a level-measuring device in which a sensor device movably mounted in a container is in contact with the toner particles and, when there is a distance between the toner particles and the sensor device, can be moved from a first into a second position which indicates that the level of the toner particles present in the storage container has fallen below that predetermined for optimum operation of the copying machine. The sensor device consists of a bar magnet, which is fitted on a rotatably mounted axle in the interior of the storage container, and of two further bar magnets which are fixed to the inner walls of the stock container. In the filled state of the storage container, the bar magnet joined to the axle is immersed in the toner and its longitudinal axis extends approximately at a right angle to the longitudinal axes of the two bar magnets which are mutually aligned. As soon as the toner stock in the stock container has fallen sufficiently that the bar magnet provided on the axle is released, the latter executes a rotation by 90° under the influence of the magnetic field lines of the two other bar magnets and comes to lie in one plane with these two bar magnets. In other words, this means that the two magnet arrangements are designed in such a way that together they generate a magnetic field which exerts a torque on the axle. This magnetic torque effects the rotation of the axle from the first into the second position when the toner present in the stock container falls below a predetermined minimum level. On rotation from the first into the second position, an electrical switch is actuated to generate an electrical signal which triggers an indicator device.

Due to the use of at least three bar magnets, this known device is relatively expensive to manufacture and does not provide resetting of the measuring device into the starting position before replenishing with toner. This means that, before toner is filled into the storage container, the bar magnet seated on the axle must be manually brought into its original position, that is to say, the first position, in which its longitudinal axis extends perpendicular to the mutually aligned longitudinal axes of the two other bar magnets, thereby ensuring a fault-free indication of the filling level.

SUMMARY OF THE INVENTION

It is the object of the invention to provide a device for determining the quantity of particles present in a container, in particular particles of pulverulent toner for replenishing a developer mixture for the powder development of a latent charge image, the device constructed in a mechanically simple fashion without the use of magnet arrangements, and largely free from operating faults.

According to the invention, this object is achieved in that the sensor device comprises a flap which is fixed on an axle rotatably mounted in the container, a resilient element urges the flap against the quantity of particles and a cam is provided on the axle, which cam can, on rotation of the axle, be brought into and out of contact with an electrical switch member.

In a preferred embodiment of the invention, the axle passes through the front wall of the container to the outside and the cam is arranged on the axle portion which is located outside the container.

The invention results in the advantage that the device is of simple mechanical construction and has, in the interior of the container, a single moving part which is largely free from operating faults. A further advantage is the facility for resetting the sensor device into its starting position, by opening the cover of the stock container for replenishing with filling material.

In the following text, the invention is described in more detail with reference to an illustrative embodiment represented in the drawing.

BRIEF DESCRIPTION OF THE DRAWING

FIG. 1 shows a partially cut-away perspective view of a container equipped with the apparatus according to the invention, with the container cover open, and FIG. 2 shows a partially cut-away perspective view of the container equipped with the apparatus according to FIG. 1, with the container cover closed and with the filling height in the container being less than the minimum.

THE PREFERRED EMBODIMENT

In the description of the illustrative embodiment shown in FIGS. 1 and 2, reference is made in the following text to replenishing with toner, but with the understanding that the device according to the invention is suitable for any pulverulent filling material which is supplied from such a container.

A container 1 of a toner-replenishing device in an electro-photographic copying machine is filled almost to the rim with toner at the beginning of the copier operation; for the sake of clarity, the copying machine itself is not shown in the drawings. In the bottom of the container 1, there is a dispenser opening with a grid 16 through which the toner can emerge into the developer mixture, which is not shown. Just above the grid 16, there is a conveying element 15 of a type known per se, for a example a screw conveyor or a brush which effects uniform dispensing of the toner through the grid 16.

When the container 1 is filled with toner up to the top, a flap 3 assumes the starting position which is shown in FIG. 1 and in which the flap 3 extends downwardly. The flap 3 is fitted on an axle 4 which is rotatably mounted in the container 1. Axle 4 is mounted near a side wall 13 and near a cover 2 of the container 1 in the rear wall thereof and extends through the front wall 10 of the container 1 to the outside. On an axle portion 4' of axle 4, located outside the container 1, a cam 5 is seated. Between the cam 5 and the outer surface of the front wall 10, the axle part 4' is surrounded by a resilient element 7, for example an operating spring, one end of which bears against or is affixed to a retainer 9 mounted on front wall 10. The other end of the operating spring can, for example, have a hook-like shape which is hung on a second lever 12. The operating spring imparts to the axle 4 a torque which urges the flap 3 upwardly when the container 1 is nearly empty. As long as the container 1 is filled with toner to a level above a predetermined minimum, the toner presses the flap 3 downwardly against the force of the resilient element 7 so that the flap extends substantially parallel to side wall 13 of container 1.

On rotation of axle 4, cam 5, seated outside the container on axle portion 4', comes into contact with or is separated from an electrical switch member 8, for example a micro-switch. The actuating portion of cam 5 extends parallel to flap 3 on axle 4, while the second lever 12 runs substantially at a right angle to cam 5 and flap 3. The micro-switch is located on the outside of front wall 10 of container 1 and, in particular, at a lateral distance from axle 4, this lateral distance being chosen such that cam 5 does not touch lug 14 of the microswitch when flap 3 is in its downwardly-extending starting position.

Container 1 is closed by a swivelling cover 2, on the narrow side 2' of which a first lever 11 is fitted, lever 11 extending downwardly when cover 2 is closed and extending horizontally when cover 2 is open. The first lever 11 is longer than side wall 13 of container 1, so that it extends beyond side wall 13 of container 1 when cover 2 is open.

The length of flap 3 is chosen to be approximately equal to the filling height of container 1. The free end of flap 3 has a cut-out 6 which is adapted to the diameter of conveying element 15 so that, in its starting position, flap 3 surrounds the conveying element 15 without being seated thereon. The contour of flap 3 is adapted to the cross-sectional area of container 1.

As soon as the filling height in container 1 falls below the minimum, due to the continuous dispensing of toner, flap 3 is released by the toner and urged upwardly by resilient element 7. As a result of the rotation of axle 4, cam 5 comes into contact with lug 14 of the electrical switch member 8. Switch member 8 is thereby actuated and emits a signal to an indicator instrument (not shown), for example, to a small signal lamp or to a buzzer, in order to call the attention of the operating personnel to the fact that it is necessary to replenish with toner. This indicating position of flap 3 is shown in FIG. 2, with cover 2 closed. As can be seen from FIG. 2, the flap 3 then assumes a substantially horizontal indicating position. Towards the end of the travel of the spring, this indicating position can be mechanically limited by a stop. In FIG. 1, flap 3 is formed with a shoulder 3', the path of motion of which is limited by a projection 1' on the container serving as a stop.

When the cover 2 is opened by the operating personnel for replenishing the container with toner, the first lever 11 undergoes a swivelling motion up to its horizontal position and, during this swivelling motion, it contacts the underside of the second lever 12 and carries it upwardly into the position shown in FIG. 1. The swivelling motion of lever 12 is transmitted to axle 4 so that flap 3 returns to its starting position as shown in FIG. 1. In the starting position of flap 3, cam 5 is rotated away from lug 14 of the electrical switch member 8 so that the micro-switch does not emit a signal to the indicator instrument. Thus, resetting of the indicator instrument is achieved in a simple manner by opening the cover 2 of container 1, since levers 11 and 12 guide flap 3 back into its starting position. After container 1 is replenished with toner, flap 3 remains in its starting position as long as the filling height of toner in the storage container does not fall below the predetermined minimum.

It can be readily seen that the minimum filling level can be predetermined by the length and shape of flap 3, that is to say, the height at which a transfer of flap 3 from its starting position according to FIG. 1 into its indicating position according to FIG. 2 will occur is determined by the length and shape of the flap. A shortening of flap 3 or an enlargement of the cut-out 6 will, of course, raise the minimum filling height in the container 1. As soon as the level of toner has fallen nearly to the lower end of the flap, the toner releases flap 3 and the force of resilient element 7 moves the flap 3 into its indicating position according to FIG. 2.

It will readily be seen that the minimum filling height can also be fixed by the strength of the leg spring 7. A higher spring force will accordingly increase the minimum filling height in container 1.

What is claimed is:

1. Apparatus for determining the quantity of particles present in a container, the container having a front wall, comprising:
    sensor flap means comprising an axle mounted for rotation relative to the container, said axle extending within the container, a flap fixed for rotation with said axle within the container, and a cam fixed for rotation with said axle and said flap;
    spring means operatively connected to said axle between said cam and an outer surface of the front container wall for biasing said sensor flap means toward an actuating position indicative of a low level of said particles in the container; and electrical switch means mounted on the outer surface of the front container wall and actuated by said cam when the flap means is in said actuating position, whereby said sensor flap means may be placed in a loaded position and said container filled with said particles, said sensor flap means being held in said loaded position by said particles and moving to said actuating position and causing said cam to actuate said electrical switch means when the quantity of said particles in the container falls below a predetermined value.

2. The apparatus of claim 1, wherein the container has an upward opening through which the container may be refilled, further comprising a cover mounted on said container for pivotal motion between an open position for refilling the container and a closed position for closing the opening, a first lever mounted on said cover outside of the container and extending at an angle to said axle when the cover is in the closed position and extending substantially parallel and adjacent to said axle and beyond the front container wall when the cover is in the open position, and a second lever extending radially outwardly from said axle and fixed for rotation with said axle, said first and second levers cooperating such that when said cover is pivoted to said open position said first lever contacts and lifts said second lever, thereby rotating said sensor flap means to said loaded position.

3. The apparatus of claim 1, wherein said cam is positioned on the axle for actuating said electrical switch means when said axle, flap means and cam are rotated from a loaded position of the flap means within the container, in which the quantity of said particles is higher than said predetermined value, to said actuating position.

4. The apparatus of claim 3, wherein the axle extends through said front container wall, said cam being mounted on a portion of said axle located outside the container.

5. The apparatus of claim 4, wherein said spring means comprises an operating lever spring located on a portion of said axle between said cam and said outer surface of the front container wall, said spring means imparting a torque to said axle which biases said flap means upwardly to said actuating position when the quantity of said particles in the container falls below the predetermined value.

6. The apparatus of claim 4, wherein the container has an upward opening through which the container may be refilled, further comprising a cover mounted on said container for pivotal motion between an open position for refilling the container and a closed position for closing the opening, a first lever mounted on said cover outside of the container and extending at an angle to said axle when the cover is in the closed position and extending substantially parallel and adjacent to said axle and beyond the front container wall when the cover is in the open position, and a second lever extending radially outwardly from said axle and fixed for rotation with said axle, said first and second levers cooperating such that when said cover is pivoted to said open position said first lever contacts and lifts said second lever, thereby rotating said sensor flap means to said loaded position.

7. The apparatus of claim 6, wherein said second lever is offset relative to said cam and aligned with said first lever such that when said cover is pivoted to the open position said first lever urges said second lever upwardly to rotate the axle and cause said flap to return to said loaded position.

8. The apparatus of claim 7 wherein said cam and flap extend radially outwardly of said axle in a co-parallel direction, and said second lever is arranged to extend at an approximately right angle to the flap.

9. The apparatus of claim 3, wherein said electrical switch means comprises a microswitch having an actuating lug positioned to contact said cam when said flap, axle, and cam are rotated to said actuating position.

10. The apparatus of claim 3, wherein the container has a predetermined cross-section and depth and a filling height representing a portion of the depth, said flap having a contour adapted to the container cross-section.

11. The apparatus of claim 10, wherein the flap has a free end having a cut-out portion.

12. The apparatus of claim 10, further comprising a projection located on an interior wall of the container and aligned with a shoulder provided on the flap, whereby the projection and the shoulder interact to limit the path of motion of the flap.

13. The apparatus of claim 9, wherein the microswitch is mounted on and outside the front container wall.

* * * * *